United States Patent
Jones et al.

(10) Patent No.: US 10,941,574 B2
(45) Date of Patent: *Mar. 9, 2021

(54) SOLAR CARPORT AND WATER MANAGEMENT AND ICICLE PREVENT SYSTEM FOR SOLAR CARPORTS AND CANOPIES

(71) Applicant: Distributed Solar Development, LLC, Niskayuna, NY (US)

(72) Inventors: Benjamin Robert Jones, Lafayete, CO (US); Alex James Norman, Schenectady, NY (US)

(73) Assignee: DISTRIBUTED SOLAR DEVELOPMENT, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,384

(22) Filed: Oct. 11, 2019

(65) Prior Publication Data

US 2020/0115905 A1  Apr. 16, 2020

Related U.S. Application Data

(60) Provisional application No. 62/744,579, filed on Oct. 11, 2018.

(51) Int. Cl.
| | |
|---|---|
| *E04D 13/064* | (2006.01) |
| *E04D 13/076* | (2006.01) |
| *H02S 20/23* | (2014.01) |
| *E04D 13/04* | (2006.01) |
| *E04H 6/02* | (2006.01) |
| *H02S 30/20* | (2014.01) |
| *H02S 40/12* | (2014.01) |

(Continued)

(52) U.S. Cl.
CPC ....... *E04D 13/064* (2013.01); *E04D 13/0445* (2013.01); *E04D 13/0641* (2013.01); *E04D 13/0645* (2013.01); *E04D 13/0762* (2013.01); *E04H 6/025* (2013.01); *H02S 20/23* (2014.12); *H02S 30/20* (2014.12); *H02S 40/12* (2014.12); *A01G 9/1476* (2013.01); *E04D 2013/0454* (2013.01); *E04D 2013/0806* (2013.01)

(58) Field of Classification Search
CPC ................................................... A01G 9/1476
USPC ........................................................ 52/13, 16
See application file for complete search history.

(56) References Cited

U.S. PATENT DOCUMENTS

| | | | | |
|---|---|---|---|---|
| 1,022,948 | A * | 4/1912 | Jacobs | E04D 13/064 |
| | | | | 52/13 |
| 1,419,126 | A * | 6/1922 | Besnard | E04B 7/12 |
| | | | | 52/13 |

(Continued)

FOREIGN PATENT DOCUMENTS

| | | | | |
|---|---|---|---|---|
| BE | 1006408 A3 * | 8/1994 | | E04D 13/064 |
| JP | 54102615 A * | 8/1979 | | |

(Continued)

*Primary Examiner* — Robert Canfield
(74) *Attorney, Agent, or Firm* — Thomas J. McWilliams; Barnes & Thornburg LLP

(57) ABSTRACT

The embodiments are apparatuses, systems and methods of water management and icicle prevention for solar carports, and are designed to catch drips between rows of, and water run-off from, the low side of inclined photovoltaic modules arranged to form the roof of the solar carport or canopy.

19 Claims, 5 Drawing Sheets

(51) Int. Cl.
*A01G 9/14* (2006.01)
*E04D 13/08* (2006.01)

(56) References Cited

U.S. PATENT DOCUMENTS

| | | | | |
|---|---|---|---|---|
| 1,693,556 | A | * | 11/1928 | Spencer .................. A01G 25/02 239/208 |
| 1,696,159 | A | * | 12/1928 | Hart ...................... A01G 9/1476 52/14 |
| 2,128,539 | A | * | 8/1938 | Roach ................... E04B 1/3416 52/73 |
| 4,150,515 | A | * | 4/1979 | Giulini ................. E04D 13/0641 52/12 |
| 4,761,919 | A | * | 8/1988 | O'Keeffe .................. E04B 7/00 52/14 |
| 5,653,067 | A | * | 8/1997 | Lago ....................... E04B 7/107 52/13 |
| 5,655,335 | A | * | 8/1997 | Vermeer .................. A01G 9/14 52/66 |
| 5,809,701 | A | * | 9/1998 | Vollebregt ........... A01G 9/1476 52/13 |
| 8,091,288 | B2 | * | 1/2012 | Van Dijk ................. A01G 9/14 52/18 |
| 8,097,151 | B2 | * | 1/2012 | Allan ........................ E03B 3/03 210/162 |
| 8,490,344 | B1 | * | 7/2013 | Chen ........................ A01G 9/14 52/173.3 |
| 8,511,007 | B2 | * | 8/2013 | Powers, III ............. E04F 10/08 52/173.3 |
| 8,794,583 | B2 | * | 8/2014 | Poivet ..................... H02S 20/23 248/500 |
| 2002/0189662 | A1 | * | 12/2002 | Lomparski .......... H01L 31/0521 136/246 |
| 2006/0101723 | A1 | * | 5/2006 | Baeta ........................ E03B 3/03 52/16 |
| 2009/0151269 | A1 | * | 6/2009 | Eiger ................... A01G 9/1476 52/11 |
| 2009/0223142 | A1 | * | 9/2009 | Shingleton .............. F24S 25/12 52/71 |
| 2010/0000596 | A1 | * | 1/2010 | Mackler .................. H02S 20/10 136/246 |
| 2010/0132274 | A1 | * | 6/2010 | Reyal ..................... F24S 25/20 52/173.3 |
| 2010/0193046 | A1 | * | 8/2010 | Moroder ................. F16L 55/24 137/357 |
| 2010/0199574 | A1 | * | 8/2010 | Perlatti ..................... E03B 3/02 52/12 |
| 2012/0131866 | A1 | * | 5/2012 | Batut ..................... F24S 25/617 52/173.3 |
| 2016/0190974 | A1 | * | 6/2016 | Dickey ................... H02S 50/10 136/244 |
| 2018/0248508 | A1 | * | 8/2018 | Keller ..................... F24S 25/35 |
| 2019/0169871 | A1 | * | 6/2019 | McKibben ............. H02S 20/23 |
| 2019/0386601 | A1 | * | 12/2019 | Keller ..................... E04H 6/025 |

FOREIGN PATENT DOCUMENTS

| | | | | |
|---|---|---|---|---|
| JP | 54137117 | A | * | 10/1979 |
| JP | 54143923 | A | * | 11/1979 |
| JP | 03172443 | A | * | 7/1991 |
| NL | 1005715 | C1 | * | 10/1998 ........... A01G 9/1476 |
| NL | 1008864 | C2 | * | 10/1999 ........... A01G 9/1476 |

* cited by examiner

SOLAR CARPORT AND WATER MANAGEMENT AND ICICLE PREVENT SYSTEM FOR SOLAR CARPORTS AND CANOPIES

CROSS-REFERENCE TO RELATED APPLICATION

This application claims the benefit of priority to U.S. Provisional Patent Application No. 62/744,579, filed Oct. 11, 2018, entitled SOLAR CARPORT, the entirety of which is incorporated herein by reference as if set forth in its entirety, and is related to U.S. patent application Ser. No. 16/600,403, entitled SOLAR CARPORT AND WATER MANAGEMENT FOR SOLAR CARPORTS AND CANOPIES, and to PCT application Serial No. PCT/US2019/055995, entitled SOLAR CARPORT AND WATER MANAGEMENT AND ICICLE PREVENT SYSTEM FOR SOLAR CARPORTS AND CANOPIES and PCT application Serial No. PCT/2019/055998, entitled SOLAR CARPORT AND WATER MANAGEMENT FOR SOLAR CARPORTS AND CANOPIES, and U.S. Design application Ser. No. 29/709,245, entitled SOLAR CARPORT, filed on even date.

BACKGROUND

Field of the Invention

Embodiments of the present invention relate generally to a solar carport, canopy or shade structure in which the roof of the structure is comprised of multiple rows of solar panels know as photovoltaic modules, and to systems and methods for water management and icicle prevention for such carports and canopies.

Description of the Background

A "solar carport" is an overhead shade canopy that includes a plurality of solar panels arranged in a plurality of rows to form the roof of the shade structure. Generally, solar carports are installed on parking areas to shield vehicles and simultaneously generate power using sunlight throughout the day. In certain types of solar carports, solar panels forming a roof plane may be angled either upwards or downwards such that the plurality of solar panels in each row is inclined along one direction to face the sunlight.

Further, in the conventional solar carport, water, snow, and/or ice may leak from the roof of the shade structure to the ground through gap(s) formed between adjacent rows of solar panels, thereby damaging vehicles and causing injury or inconvenience to pedestrians below the solar carport. To address such issues, the conventional solar carport uses a water management system including a metal roof with an additional layer of racking to secure the solar panels. However, the usage of the metal roof may result in power production losses due to heat build-up and lack of air circulation around the solar panels. Further, the metal roof may also block an access to install/replace/maintenance of the solar panels.

Alternate methods of water management include the use of sealants, such as, gaskets or silicone to fill gap between adjacent solar panels. However, usage of sealants results in accumulation of a greater volume of water, snow, and/or ice on lower edge portions of the solar panels. Furthermore, many solar panels are not completely sealed between the cell/panel glass and an aluminum frame, resulting in leaks even with the gaps between panels are sealed. Thus, the conventional solar carport may further incur power production losses and additional maintenance cost. Further, gaskets may tend to leak, loosen, and fail due to freeze-thaw cycles. Also, the silicone disposed between the solar panels may promote water pooling on a face of the solar panel glass, thereby affecting the solar panels.

Accordingly, there is a need for an improved water management and icicle prevention system for solar carports and canopies.

BRIEF SUMMARY

The embodiments are the apparatus and supports of the water management and icicle prevention system designed to catch drips between rows, and water run-off from, the low side of inclined photovoltaic modules arranged to form the roof a solar carport or canopy. Under certain weather conditions, icicles can form on the low side of the photovoltaic module frame and the water management and icicle prevention system is designed to capture icicles and encourage bridging of snow and ice over the gap between modules until melting occurs, whereupon water is discharged through the system in a controlled and deliberate manner. The water management and icicle prevention system is composed of four main components supported and arranged in a unique and novel manner. The four main components are: mini gutters, primary gutters, leader heads and downspouts that are supported by blocking, clips and brackets.

Mini gutters run longitudinally along the length of the solar carport or canopy beneath the gap between modules either in a single slope or a dual slope configuration. Mini gutters are supported by blocking between purlins that support the photovoltaic modules. Mini gutters may typically be 8"-14" (200 mm-350 mm) wide and typically 2"-3" (50 mm-75 mm) deep, by way of non-limiting example only, and their dimensions and inclination angles may be calculated according to plumbing codes and precipitation data to evacuate the desired quantity of water and discharge at a defined rate. Mini gutters may include end caps at the "high" end to prevent undesired discharges and potential icicle formation.

Mini gutters discharge the water they convey and that water cascades into primary gutters that run perpendicular to the length of the solar carport or canopy, typically along or parallel to the primary beam or rafter line. Primary gutters may be supported by brackets located beneath module support purlins. These brackets support both the ends of mini gutters and enable primary gutters to hang at an inclined angle. Collection gutters may typically be 8"-12" (200 mm-300 mm) wide and typically 8"-12" (200 mm-300 mm) deep and their dimensions and inclination angles may be calculated according to plumbing codes and precipitation data to evacuate the desired quantity of water and discharge at a defined rate. Primary gutters may have end caps at the "high" end to prevent undesired discharges and potential icicle formation.

Water in the collection gutters may transition into vertical downspouts at custom leader heads that may typically be 12"-24" (300 mm to 600 mm) wide and 18"-30" (450 mm-750 mm) tall. Leader heads may be installed around collection gutters and typically have single or multiple inserts around which single or multiple downspouts connect. Leader heads are often in a keystone shape and occasionally a direct connection of a downspout to a collection gutter is achieved with an insert at the bottom of a collection gutter.

Leader heads are designed, sometimes with integrated restrictors and filters, to control water discharge rates into downspouts.

Downspouts may convey all water from the water management system and discharge onto the ground, over a storm drain, into a swale, over a catch basin, into a tank or directly into pipes of a storm drain system, depending on the requirements of a particular site. In certain applications, rain water may be captured, potentially stored, and used for on-site irrigation. Downspouts are typically supported by brackets connected to columns that support beams or rafters of the solar carport or canopy. Downspouts are typically 3"-8" (75 mm-200 mm) in diameter, or similar square or rectangular dimensions. Downspout dimensions and angles may be calculated according to plumbing codes and precipitation data to evacuate the desired quantity of water and discharge at a defined rate.

Thereby, the embodiments provide at least an improved solar carport or canopy with a water management and icicle prevention system.

BRIEF DESCRIPTION OF THE DRAWINGS

The exemplary compositions, systems, and methods shall be described hereinafter with reference to the attached drawings, which are given as non-limiting examples only, in which like numerals may represent like elements, and in which.

DETAILED DESCRIPTION

Figure 1:
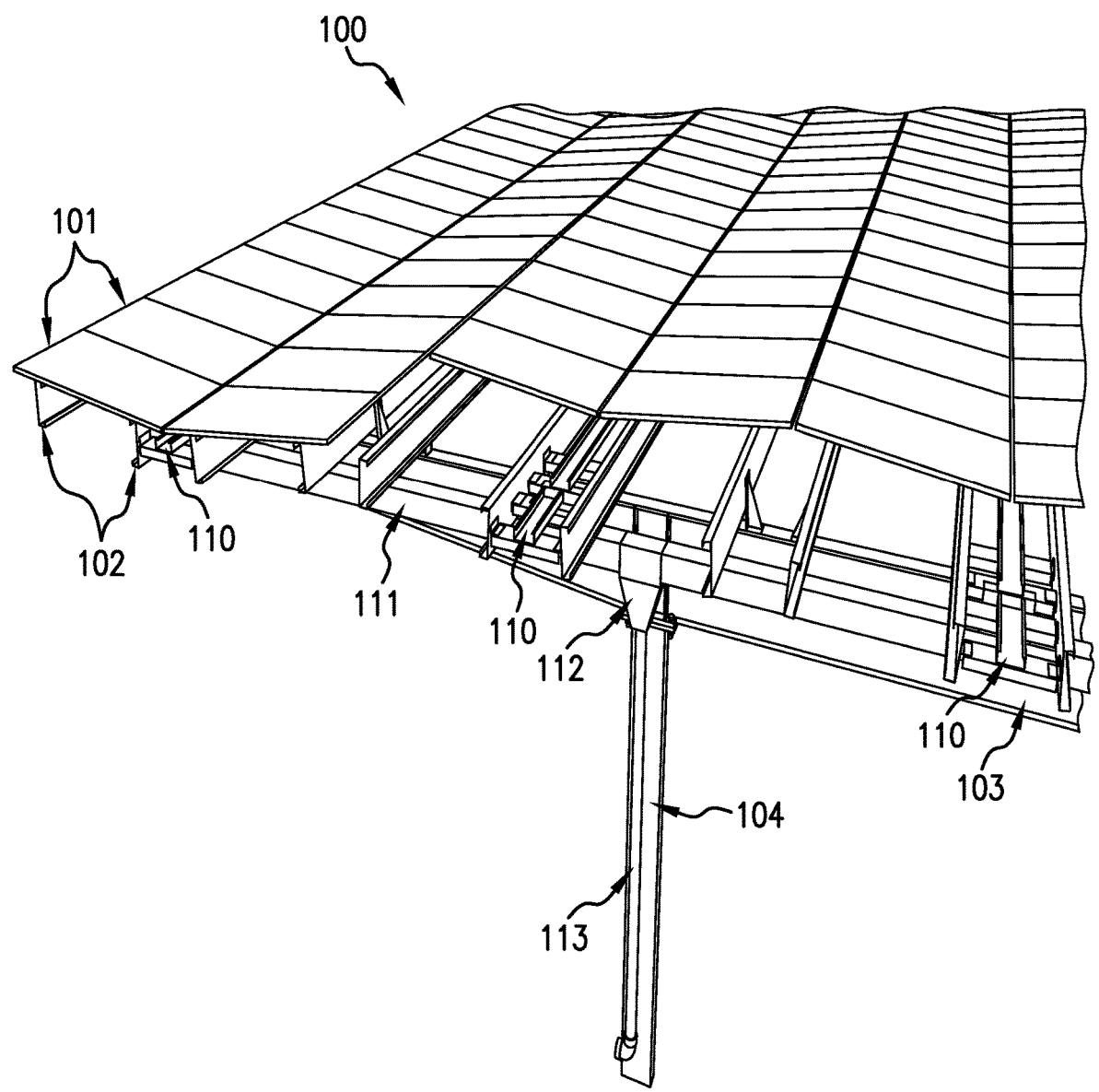
FIG. 1 illustrates an embodiment of a solar carport or canopy with a water management and icicle prevention system.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the disclosed embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. That is, these terms may be only used to distinguish one element, component, region, layer or section from another element, component, region, layer or section. Thus, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Embodiments of the present invention disclose at least a water management and icicle prevention system for solar carports and canopies. The embodiments may also include a method of making and using the same.

FIG. 1 illustrates an isometric view of an exemplary dual slope solar carport or canopy 100 with a water management and icicle prevention system 110, 111, 113, etc. in accordance with an embodiment of the present specification. The solar carport 100 may be installed and/or built on a parking area, by way of example, and configured to shield one or more vehicles (not shown) and simultaneously generate electric power using sunlight.

The dual slope solar carport or canopy 100 includes solar panels, also known as photovoltaic modules 101, supported by pairs of purlins 102, on beam or rafter 103 supported by a column 104. When viewed directly, the panels 101 may, in conjunction with each other and with beams 103 and column 104, form any of various shapes advantageous in directing water to the water management system. Such shapes may include, by way of example, mirrored angling of respective ones of the panels 101 to form "V" shapes with regard to immediately adjacent panels 101; "W" shapes with regard to sets of four immediately adjacent interior panels 101; and a "W-T" or "V-T" shape formed by adjacent ones of the panels (the "V" or the "W") 110 atop the beams 103 and columns 104 (in combination, the "T"). Of course, numerous other shapes may be used to direct water to the water management system without departing from the scope and spirit of this disclosure, as will be appreciated by the skilled artisan.

The solar carport 100 may include at least one column 104 arranged vertically with a first end affixed to a ground and a second end supporting beams 103. Each column 104 may have a length protruding upwards from the ground to the beam 103. The length may be in a range from about 10 feet to about 18 feet, by way of non-limiting example, so as to provide sufficient clearance for vehicles under the carport 100.

Each beam 103 may provide a horizontal indirectly supporting structure above which the panels 101 may be mounted. The pairs of purlins 102 may be spaced apart from each other and apart from other pairs, and may be disposed over the beams 103 to allow for a direct or indirect coupling of the plurality of solar panels 101 to the pairs of purlins 102. All of the foregoing elements may be coupled or otherwise fastened, permanently or temporarily, using mechanical connectors known to those skilled in the pertinent arts.

The elements of the water management and icicle prevention system may comprise at least mini-gutters 110, primary gutters 111, leader heads 112, and downspouts 113. Mini gutters 110 are supported by blocking 114 on bent brackets 115 that run perpendicular and between purlins 102 and fastened with clips 116. Mini gutters 110 transition to primary gutters 111 at primary gutter support brackets 117. Leader heads 112 connect primary gutters 111 to downspouts 113 that are supported by downspout brackets or pipe clamps 118.

Figure 2:
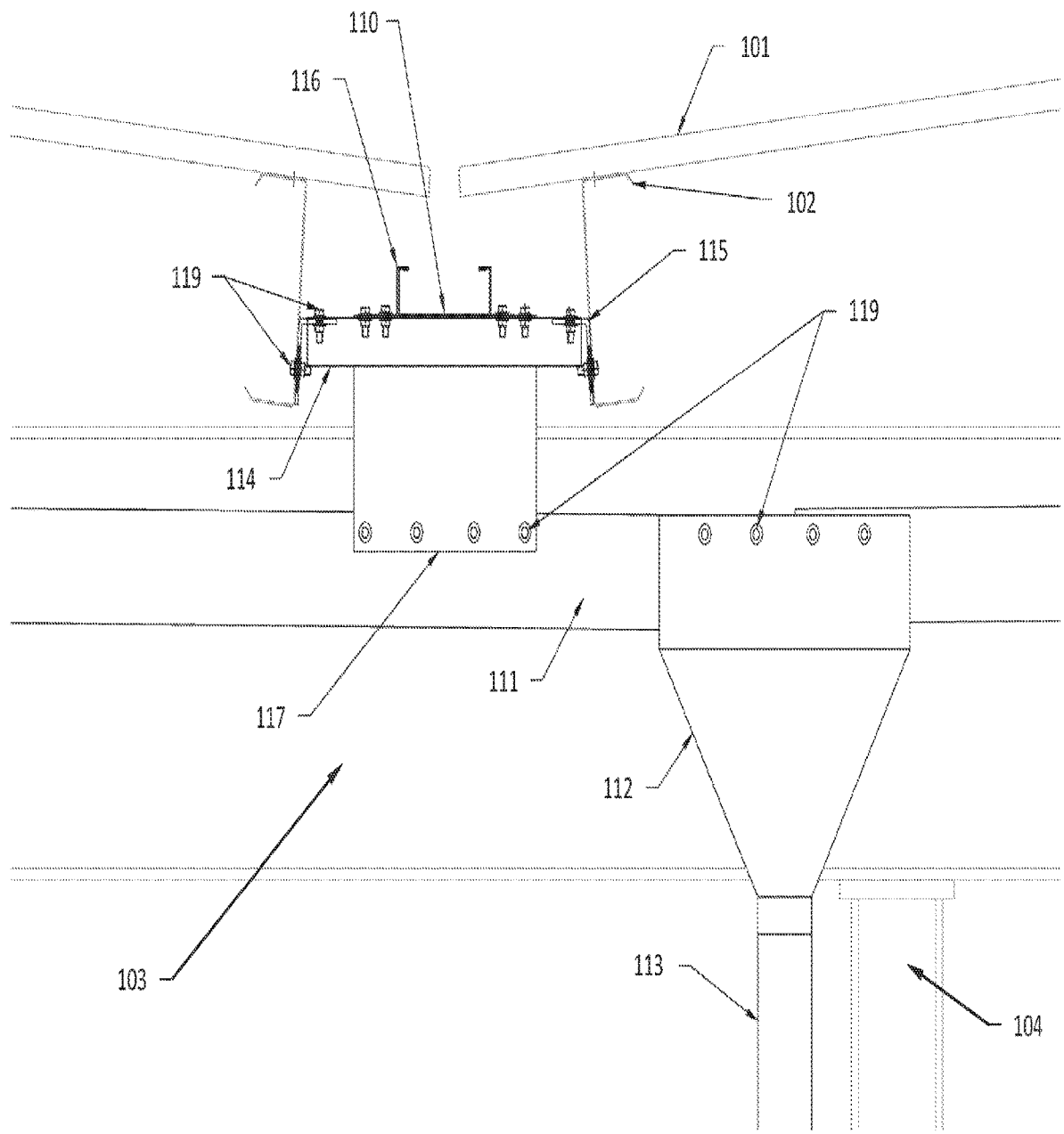
FIG. 2 illustrates an embodiment of a solar carport or canopy with a water management and icicle prevention system.

FIG. 2 illustrates a portion of water management and icicle prevention system. The cross-sectional view shows the mini gutter 110 that runs the length of the carport or canopy and catches water, snow and ice that falls from an inclined photovoltaic module 101. In this illustration, the photovoltaic modules 101 are inclined at opposite angles to form a "valley", i.e., a "V" shape, which may also form a part of a "W" shape, in a dual slope solar carport or canopy, and the mini gutter 110 is positioned horizontally beneath the gap between modules. On a single slope solar carport or canopy, the mini gutter 110 may inclined in parallel with the beam or rafter 103. The mini gutter 110 is inclined at angle β to enable water to flow at the desired rate either by following the average longitudinal slope of the carport or canopy 100 or by adjusting bent brackets 115 to alter the elevation of the mini gutter support blocking 114 and create a slope for the mini gutters 110. The mini gutter 110 is supported by blocking 114 between module support purlins 102. Galvanized hardware 119 with neoprene washers may be used to connect components of the water management and icicle prevention system together, by way of non-limiting example.

Figure 3:
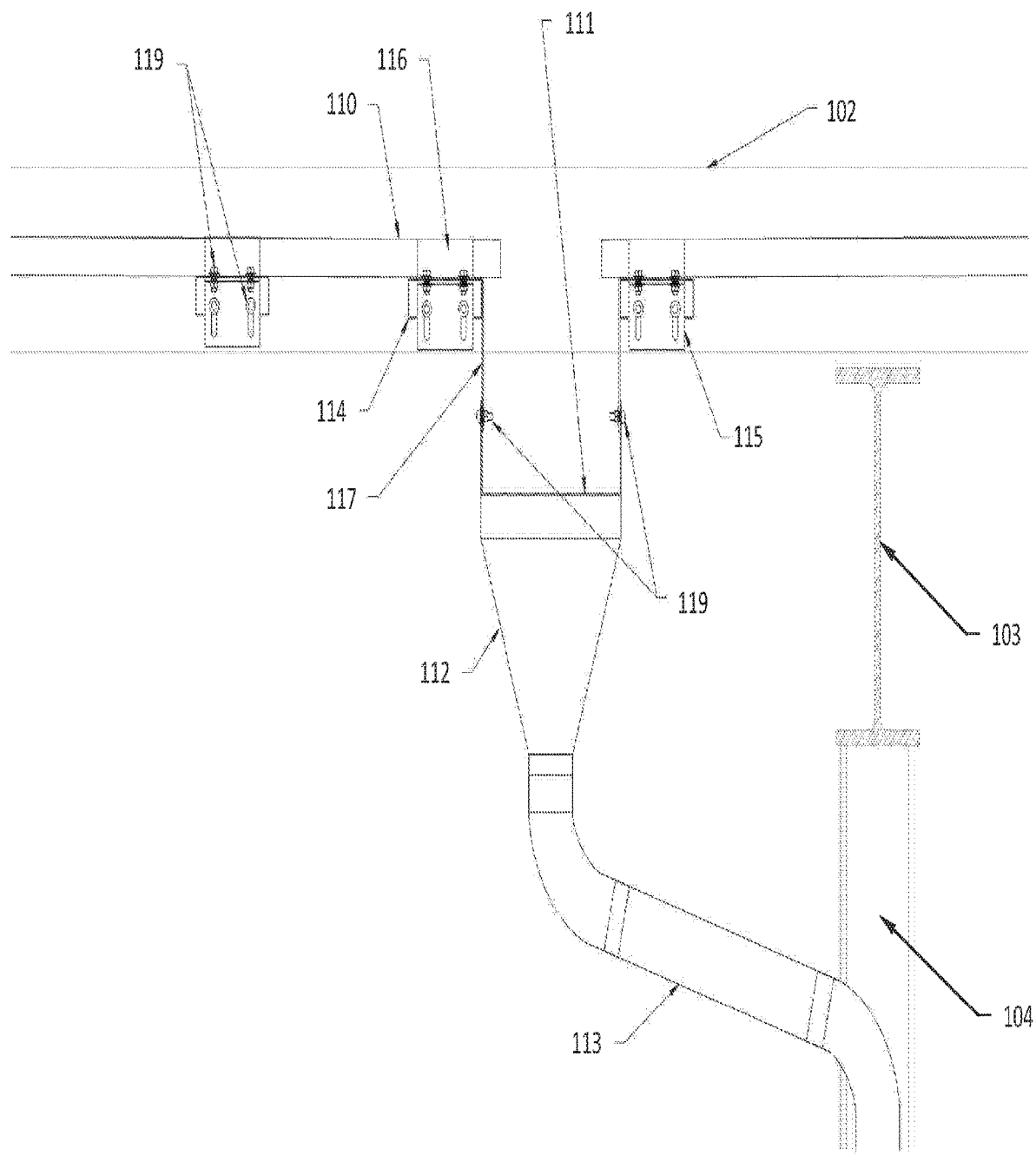
FIG. 3 illustrates an embodiment including mini gutters, support blocking and clips.

FIG. 3 illustrates a portion of water management and icicle prevention system. The elevation view shows how water in mini gutters 110 cascade into a collection gutter 111 and then into downspouts 113 via a transition at a leader head 112. The collection gutter 111 is support by a hanger clip or primary gutter support bracket 117.

Each mini-gutter 110 may be an open channel having "U", "V", or rectangular-shaped cross section. Each mini-gutter 110 may extend parallel or perpendicular to an adjacent pair of purlins 102, and/or may be disposed along an intermediate region defined between pairs of purlins 102, and may reside below a gap formed between adjacent ones of solar panels 101, such as at a gap at the union of the bases of the downslopes of adjacent panels 101 in a "V" configuration.

As referenced in FIG. 2, mini gutters 110 may be supported by blocking 114 on bent brackets 115 that run perpendicular and between purlins 102 and fastened with clips 116. Mini gutters 110 transition to primary gutters 111 at primary gutter support brackets 117. Leader heads 112 connect primary gutters 111 to downspouts 113 that are supported by downspout brackets or pipe clamps 118.

More specifically, mini gutters 110 may run longitudinally along the length of the solar carport or canopy beneath the gap formed between adjacent panels 101, such as in a single incline or a dual incline configuration. Mini gutters 110 may be supported by blocking between purlins 102 that support the photovoltaic modules 101. Mini gutters 110 may typically be 8"-14" (200 mm-350 mm) wide and typically 2"-3" (50 mm-75 mm) deep, by way of non-limiting example only, and their dimensions and inclination angles may be calculated according to plumbing codes and precipitation data to evacuate the desired quantity of water and discharge at a defined rate. Mini gutters 110 may include end caps at the "high" end, such as in a single slope configuration, to prevent undesired discharges and potential icicle formation.

Mini gutters 110 discharge the water they convey and that water cascades into primary gutters 111. Primary gutters 111 may run perpendicular to the length of the solar carport or canopy, typically along or parallel to the primary beam or rafter 103 line, by way of non-limiting example. Primary gutters 111 may be supported, directly or indirectly, by purlins 102, such as by brackets located beneath purlins 102. These brackets support both the ends of mini gutters 110 and may enable primary gutters 111 to hang at an inclined angle. Primary gutters 111 may typically be 8"-12" (200 mm-300 mm) wide and typically 8"-12" (200 mm-300 mm) deep and their dimensions and inclination angles may be calculated according to plumbing codes and precipitation data to evacuate the desired quantity of water and discharge at a defined rate. Primary gutters 111 may have end caps at the "high" end to prevent undesired discharges and potential icicle formation.

Water in the primary gutters 111 may transition into vertical downspouts 113 at custom leader heads 112 that may typically be 12"-24" (300 mm to 600 mm) wide and 18"-30" (450 mm-750 mm) tall, by way of non-limiting example. Leader heads 112 may be installed around primary gutters 111 and may typically have single or multiple inserts around which single or multiple downspouts 113 connect. Leader heads 112 are often a keystone shape, and a direct connection of a downspout 113 to a collection gutter 111 may be achieved with an insert at the bottom of the collection gutter 111. Leader heads 112 are designed, sometimes with integrated restrictors and filters, to control water discharge rates into downspouts 113.

Downspouts 113 may convey all water from the water management system 110, 111, 113, etc. (400 below) and discharge it onto the ground, over a storm drain, into a swale, over a catch basin, into a tank or directly into pipes of a storm drain system, depending on the requirements of a particular site. In certain applications, rain water may be captured, potentially stored, and used for on-site irrigation. Downspouts 113 are typically supported by brackets that may also support beams or rafters 103 of the solar carport or canopy. Downspouts 113 are typically 3"-8" (75 mm-200 mm) in diameter, or similar square or rectangular dimensions. Downspout dimensions and angles may be calculated according to plumbing codes and precipitation data to evacuate the desired quantity of water and discharge at a defined rate.

Figure 4:
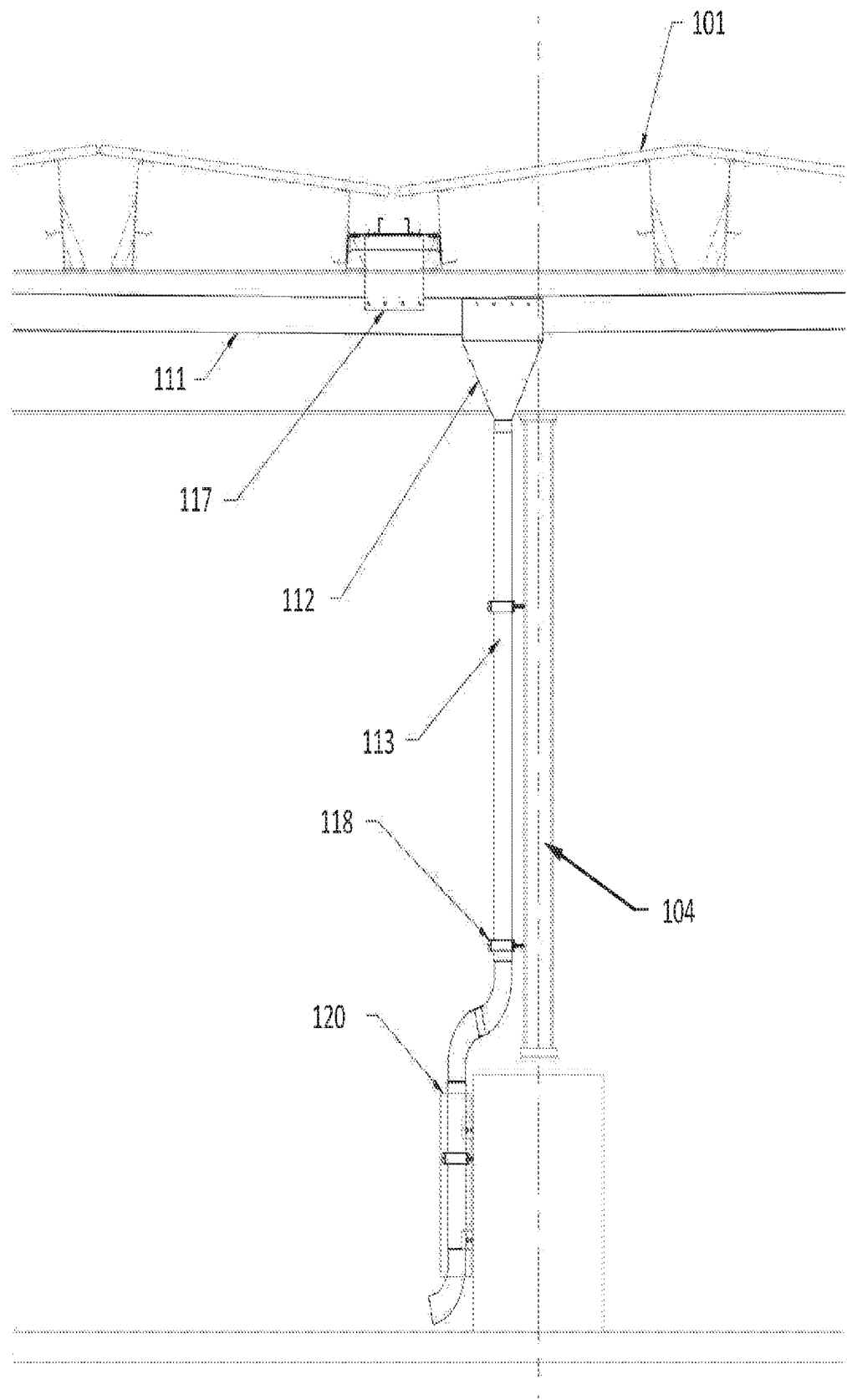
FIG. 4 illustrates an embodiment including primary gutters and support brackets.

FIG. 4 illustrates a portion of water management and icicle prevention system. The cross-sectional view shows the general assembly of elements of the water management and icicle prevention system, including: mini-gutters 110, primary gutters 111, leader heads 112, and downspouts 113.

Figure 5:
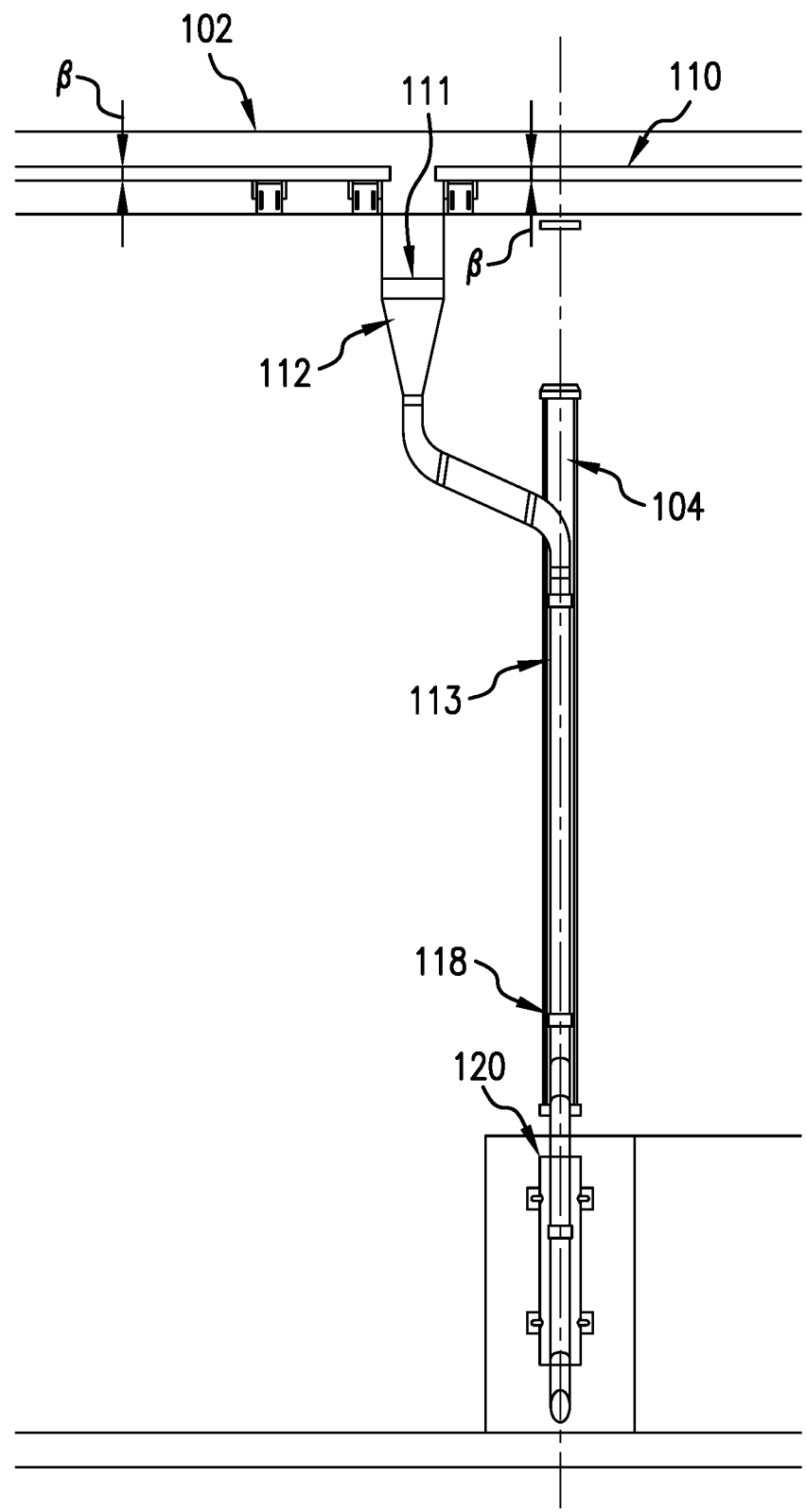
FIG. 5 illustrates an embodiment including leader heads and gutters and downspouts.

FIG. 5 illustrates a portion of water management and icicle prevention system. The cross-sectional section view shows the general assembly of the main elements of the water management and icicle prevention system: mini-gutters 110, primary gutters 111, leader heads 112, and downspouts 113.

Each mini-gutter 110 as discussed above may direct a flow of fluid to the respective primary gutter(s) 111. The primary gutter(s) 111 may channel the flow of the fluid to the respective downspout 113, such as via a chamber. Further, the downspout 113 may discharge the fluid over desirable locations in the ground.

Thus, the fluid management system of the present specification prevents damage to vehicles and reduces the risk of injury to pedestrians standing below the solar carport from a falling ice hazard. In certain embodiments, the fluid from the fluid management system may be collected for on-site irrigation. The fluid management system is considerably lower cost to supply and install than a metal roof that may require the secondary racking system. Further, the fluid management system also eliminates power production losses due to heat build-up and lack of air circulation around the first and second set of solar panels. Moreover, the disclosed embodiments of the solar carport enable unrestricted access to install/replace solar panels from below. Also, the fluid management system may not require the conventional sealants, thereby reducing the problems associated with the sealants.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. While only certain features of the invention have been illustrated and described herein, many modifications and changes will occur to those skilled in the art.

What is claimed is:

1. A solar carport system having an integrated water management system, comprising:
   a canopy resting upon a column, the canopy comprising:
      a plurality of beams axially perpendicular to the at least one column
      a plurality of pairs of purlins supported upon the plurality of beams; and
      a plurality of rows of complementarily paired solar panels supported upon
   the plurality of purlins to form a series of W-shapes in profile;
   the water management system being integrated to the canopy, and comprising:
      a plurality of mini-gutters suitable to receive fluid flow, running parallel to a length of each row of the paired solar panels, and aligned with a gap formed between each panel of each of the paired solar panels and running along a length of each row of the paired solar panels;
      a plurality of primary gutters suitable to receive the received fluid flow from fluidically associated ones of the plurality of mini-gutters; and
      a plurality of downspouts fluidically associated with ones of the plurality of primary gutters and suitable to disperse the received fluid flow.

2. The solar carport system of claim 1, wherein the mini-gutters are inclined with respect to the beams.

3. The solar carport system of claim 2, further comprising support blocking for the mini-gutters, and wherein the incline is imparted by the support blocking.

4. The solar carport system of claim 3, further comprising adjustable bent brackets capable of imparting the incline to the support blocking.

5. The solar carport system of claim 1, wherein each of the mini-gutters is integrated between ones of the pairs of purlins.

6. The solar carport system of claim 1, further comprising a leader head suitable to provide a fluidic transition between the primary gutter and the downspout.

7. The solar carport system of claim 1, wherein each of the plurality of the mini-gutters comprises an open channel having one of a U, a V, or rectangular -shaped cross section.

8. The solar carport system of claim 1, further comprising integrated downspout brackets capable of supporting the downspouts.

9. The solar carport system of claim 1, wherein the mini gutters are between 8"-14" (200 mm-350 mm) wide.

10. The solar carport system of claim 1, wherein the mini gutters are between 2"-3" (50 mm-75 mm) deep.

11. The solar carport system of claim 1, wherein dimensions and inclination angles of the mini-gutters are calculated according to plumbing codes and precipitation data to evacuate a desired quantity of water.

12. The solar carport system of claim 1, wherein ones of the mini-gutters include end caps at a high end thereof suitable to prevent undesired discharges and icicle formation.

13. The solar carport system of claim 1, wherein the primary gutters are be 8"-12" (200 mm-300 mm) wide.

14. The solar carport system of claim 1, wherein the primary gutters are 8"-12" (200 mm-300 mm) deep.

15. The solar carport system of claim 1, wherein dimensions and inclination angles of the primary gutters are calculated according to plumbing codes and precipitation data to evacuate a desired quantity of water and to discharge at a defined rate.

16. The solar carport system of claim 1, wherein ones of the primary gutters include end caps at the high end thereof to prevent undesired discharges and icicle formation.

17. The solar carport system of claim 1, wherein the downspouts are 12" -24" (300 mm to 600 mm) wide.

18. The solar carport system of claim 1, further comprising a tank, wherein dispersal from the downspout is to the tank.

19. The solar carport system of claim 18, wherein irrigation occurs from the tank.

* * * * *